United States Patent [19]
Dixon et al.

[11] 3,882,152
[45] May 6, 1975

[54] BETA CYCLOPENTADIENYL HYDRAZIDES AND CARBAZATES

[75] Inventors: Dale D. Dixon, Kutztown; Joseph V. Urenovitch, Allentown, both of Pa.

[73] Assignee: Air Products and Chemicals, Inc., Philadelphia, Pa.

[22] Filed: Sept. 9, 1970

[21] Appl. No.: 70,883

[52] U.S. Cl.......... 260/468 E; 260/454; 260/468 J; 260/514 J; 260/518 A; 260/558 H; 260/561 H; 424/300; 424/302; 424/305; 424/317; 424/320; 424/324
[51] Int. Cl............................................ C07c 125/00
[58] Field of Search.......................... 260/468 E, 479

[56] References Cited
UNITED STATES PATENTS
3,420,868  1/1969  Weil.................................. 260/463
3,689,554  10/1972  Ley et al............................ 260/557

OTHER PUBLICATIONS
Smith, Open Chain Nitrogen Compounds, p. 163 (1966).

*Primary Examiner*—Robert Gerstl
*Attorney, Agent, or Firm*—Leroy Whitaker; Everet F. Smith

[57] ABSTRACT

Beta tetrachlorocyclopentadienyl alpha methyl hydrazide, having the formula $C_5Cl_4NNHCOCH_3$, is a fungicide, and can be prepared by room temperature reaction of acetic anhydride (or a tertiary amine and acetyl chloride) with $C_5Cl_4NNH_2$. Chloroformate esters permit formation of similar carbazates. Selected substituents on the cyclopentadienyl group and/or on the group attached to the carbonyl group are identified. Such compounds have biological activity, particularly as a foliar fungicide and/or as a soil fungicide.

2 Claims, No Drawings

BETA CYCLOPENTADIENYL HYDRAZIDES AND CARBAZATES

BACKGROUND OF THE INVENTION

Those skilled in the art would ordinarily expect hydrazones having less than 6 carbon atoms to be soluble in dilute acid. However, tetrachlorocyclopentadienone hydrazone is insoluble even in concentrated hydrochloric acid according to H. Disselnkotter, Agnew Chem (1 ntl. Ed.) 3 (No. 5), 379 (1964). Disselnkotter also noted that it did not react with aldehydes or ketones thus distinguishing tetrachlorocyclopentadienone hydrazone from conventional hydrazones. The inertness of this hydrazone has tended to discourage its investigation.

SUMMARY OF THE INVENTION

In accordance with the present invention, a cyclopentadienone hydrazone is reacted with an acid halide or acid anhydride to provide a carbazate or a hydrazide. It is convenient to employ Y to designate the cyclopentadienone group, so that the hydrazone is Y = $NNH_2$.

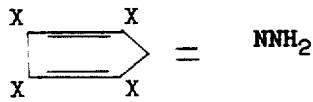

wherein X is independently selected from fluorine, chlorine, bromine, and hydrogen. The acid chloride is represented by QCOX, in which Q designates a substituted or unsubstituted hydrocarbyl radical of a hereinafter designated class. A chloroformate ester QCOX in which Q is an alkoxy radical reacts similarly to an acid chloride. An acid anhydride can be designated as $(QCO)_2O$. Internal anhydrides (sometimes called cyclic anhydrides) such as maleic anhydride or phthalic anhydride can be designated as $Z(CO)_2O$ in which Z partakes of the nature of Q—Q while still partaking of the nature of Q. In order to embrace internal anhydrides, linear anhydrides, chloroformate esters, and acid halides, the term A designates all four so that QCOA designates the four types of carbonyl reactants. Thus the generic reaction is:

$YNNH_2 + QCOA \rightarrow YNNHCOQ + HA$

The Q of the desired product YNNHCOQ or

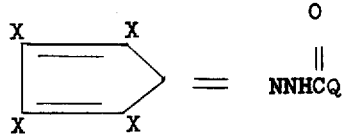

is selected from the group consisting of:
a. Hydrocarbyl radicals having 1 to 4 carbon atoms.
b. Substituted $C_1$–$C_4$ alkyl radicals having halogen substituents.
c. Substituted $C_1$–$C_4$ alkyl radicals having alkyl ether or thiocyanate substituents.
d. $C_3$ alkenoic acid radical or halogenated $C_3$ alkenoic acid radical, where the halogen is fluorine, chlorine, or bromine.
e. Phenyl radical
f. Orthonitrophenyl radical
g. Meta-dinitrophenyl radical, and
h. $C_1$–$C_6$ alkoxy radicals.

The carbazates are represented by the YNNHCOQ compounds in which Q is a $C_1$–$C_6$ alkoxy radical. The hydrazides are represented by the YNNHCOQ compounds in which Q is selected from (a) through (g) above.

Certain described novel compounds have been found by the present invention to possess biological activity, particularly as foliar fungicides and/or as soil fungicides.

Certain of the compounds can be prepared by the reaction of $YNNH_2$ with QCOA in which Q has the designation heretofore given and A identifies a member of the group consisting of halide, linear anhydride component, and cyclic anhydride component. The presence of a proper amount of tertiary amine capable of reacting with hydrogen halide by-product is desirable when a chloroformate ester or an acid halide is employed. $YNNH_2$ can also be reacted with linear acid anhydrides in the absence of any tertiary amine, but a catalytic or even stoichiometric amount of tertiary amine is generally not harmful in using linear acid anhydrides. Surprisingly the cyclic anhydrides cannot be readily reacted with tetrahalocyclopentadienone hydrazone unless catalytic amounts (e.g., 10% of stoichiometric amounts) of a tertiary amine are present.

DESCRIPTION OF A FEW PREFERRED EMBODIMENTS

The invention is further clarified by reference to a plurality of examples.

The preferred synthetic method features the reaction of tetrachlorocyclopentadienone hydrazone with a suitable halide of the substituent to be attached to the alpha nitrogen of the hydrazone. Great care must be exercised in the synthesis because of the propensity of the products and/or reactants to undergo polymerization and/or hydrolysis reactions. If appropriate precautions are taken, then the compounds of the present invention may be prepared by any of the appropriate series of steps for combining several moieties of the compounds to prepare YNNHCOQ.

EXAMPLE 1

An Erlenmeyer flask (500 ml.) containing 200 ml. of dry tetrahydrofuran is provided with a stirrer. The reactants, 10.0 grams (0.043 mol.) of tetrachlorocyclopentadienone hydrazone, 3.4 grams (0.043 mol.) of acetyl chloride, and 4.5 grams (0.043 mol.) of triethyl amine were added (one reactant being added dropwise) and the crude solution was filtered to separate the hydrochloride salt of triethylamine. In similar reactions, previous workers have generally indicated the desirability of heating to reflux, and thereafter cooling the mixture prior to the separation of the salt. By reason of the ease of decomposition of the product in its synthesis environment, the synthesis and preliminary isolation of product were conducted without heating. The tetrahydrofuran solvent was removed from the filtrate by controlled vacuum treatment. The residual material was dissolved in hot methanol and the solution cooled to provide recrystallized product. The compound $C_5Cl_4NNHCOCH_3$ melted at 138°–140°C. and its elemental analysis was reasonably consistent with the expected compound as indicated in the following analytical results for alpha acetyl beta tetrachlorocyclopentadienyl hydrazide $C_7H_4Cl_4N_2O$.

|   | CALCULATED | FOUND |
|---|---|---|
| C | 30.69 | 29.90 |
| H | 1.46 | 1.64 |
| N | 10.22 | 10.03 |

The compound $C_5Cl_4NNHCOCH_3$ (or YNNHCOMe) was dissolved in solution which was a suitable solvent (acetone, methanol, ethanol or other) and the solution was dispersed in deionized water containing wetting and dispersing agents to provide an aqueous solution. The solution did not damage any plants in the fungicidal testing, so no tabulation thereof was necessary. The percentage of killing of the fungus was noted as a measure of the fungicidal effectiveness.

It was noted that $C_5Cl_4NNHCOCH_3$ killed 92% of the late blight tomato (LBT) and 71% of the leaf rust wheat (LRW) when the standard aqueous spray treatment solution contained only 75 ppm of the alpha methyl beta tetrachlorocyclopentadienyl hydrazide. At a concentration of 30 ppm, 76% of the LBT was killed.

In the standard procedure for evaluating the foliar fungicidal effectiveness of a candidate compound, a group of plants was placed upon a turntable which was rotated to receive evaluated controlled amount of aqueous spray. The fungicidal activity was evalulated by determining the concentration of a compound in the aqueous spray which could produce a significant fungicidal effect.

EXAMPLES 1–33

Following the general procedure of Example 1, various beta tetrachlorocyclopentadienyl hydrazides and carbazates were prepared as indicated in Table I.

TABLE I

|  |  |  | CALCULATED |  |  | FOUND |  |  |
|---|---|---|---|---|---|---|---|---|
| q |  | M. P. | C | H | N | C | H | N |
| 1. | $-CH_3$ | 138–140° | 30.69 | 1.46 | 10.22 | 29.90 | 1.64 | 10.03 |
| 2. | $-CH_2Cl$ | 135–136° | 27.20 | 0.98 | 9.10 | 26.81 | 1.05 | 10.42 |
| 3. | $-CCl_3$ | 122–124° | 22.10 | 0.29 | 7.42 | 24.48 | 0.66 | 9.24 |
| 4. | $-CH_2-CH(Br)-CH_3$ | 112° | 28.40 | 1.84 | 7.35 | 28.82 | 1.92 | 7.22 |
| 5. | $-CH_2-CH(Cl)-CH_3$ | 84–85° | 32.20 | 2.04 | 8.34 | 32.34 | 2.04 | 8.49 |
| 6. | —△ (cyclopropyl) | 152–153° | 36.39 | 1.02 | 9.43 | 35.81 | 2.01 | 9.36 |
| 7. | $-CH_2OCH_3$ | 114–116° | 31.58 | 1.97 | 9.20 | 29.92 | 1.70 | 9.98 |
| 8. | $-CH_2-O-CH_2-CH_3$ | 116–117° | 34.00 | 2.50 | 8.80 | 33.82 | 2.34 | 8.93 |
| 9. | $-CH_2-O-CH_2-CH_2-CH_3$ | 100–102° | 36.19 | 3.15 | 8.44 | 36.41 | 3.07 | 8.44 |
| 10. | $-OCH_3$ | 130–131° | 28.96 | 1.38 | 9.65 | 29.10 | 1.42 | 9.46 |
| 11. | $-O-CH_2-CH_3$ | 113–114° | 31.63 | 1.98 | 99.23 | 31.96 | 2.00 | 9.34 |
| 12. | $-O(CH_2)_2CH_3$ | 89–90° | 33.96 | 2.51 | 8.80 | 33.88 | 2.44 | 8.65 |
| 13. | $-O-CH(CH_3)_2$ | 159–160° | 33.96 | 2.51 | 8.80 | 33.81 | 2.39 | 8.60 |
| 14. | $-O-CH_2-CH=CH_2$ | 101° | 34.20 | 1.90 | 8.90 | 34.19 | 1.81 | 9.06 |
| 15. | $-CH_2-C(=O)-OCH_3$ | 128–129° | 32.60 | 1.80 | 8.50 | 34.51 | 2.21 | 7.93 |
| 16. | $-CH_2Br$ | 162–164° | 23.80 | 0.09 | 7.93 | 23.71 | 0.74 | 7.89 |
| 17. | $-CH_2-S-C\equiv N$ | 145–148° | 29.05 | 0.92 | 12.72 | 29.22 | 0.90 | 12.71 |
| 18. | $-CH(Br)-CH_3$ | 92–94° | 26.20 | 1.36 | 7.65 | 29.34 | 1.25 | 9.43 |
| 19. | $-CH_2-CH_2Cl$ | 98–100° | 29.73 | 1.55 | 8.68 | 30.43 | 1.40 | 8.82 |
| 20. | $-CH_2-CH_2-CH_3$ | 121–123° | 35.50 | 2.68 | 9.30 | 36.06 | 2.77 | 9.23 |
| 21. | $-CH(CH_3)_2$ | 100–101° | 35.68 | 2.64 | 9.27 | 35.49 | 2.61 | 9.07 |
| 22. | $-C(CH_3)_3$ | 152–153° | 38.00 | 3.43 | 8.86 | 38.11 | 3.05 | 9.04 |
| 23. | $-(CH_2)_3-CH_3$ | 99–100° | 38.00 | 3.43 | 8.86 | 37.91 | 3.43 | 9.01 |
| 24. | $-CH_2-CH(CH_3)_2$ | 116–117° | 38.00 | 3.43 | 8.85 | 37.90 | 3.13 | 8.65 |

TABLE I -- continued

ELEMENTAL ANALYSIS

| Q | M.P. | CALCULATED | | | FOUND | | |
|---|---|---|---|---|---|---|---|
| | | C | H | N | C | H | N |
| 25. -C(CH₃)₂-Br | 145-146° | 28.40 | 1.84 | 7.35 | 28.93 | 1.86 | 7.27 |
| 26. -O-(CH₂)₃-CH₃ | 64-65° | 36.20 | 3.01 | 8.44 | 36.22 | 3.08 | 8.49 |
| 27. -O(CH₂)₅-CH₃ | 50-51° | 40.02 | 3.92 | 7.78 | 40.16 | 3.93 | 7.84 |
| 28. -O-CH₂-⌬ | 112-113° | 42.60 | 2.20 | 7.66 | 42.78 | 2.15 | 7.64 |
| 29. -O-⌬ | 168-169° | 40.90 | 1.71 | 7.95 | 41.09 | 1.69 | 8.06 |
| 30. -⌬ | 143-145° | 43.02 | 1.50 | 8.36 | 40.36 | 1.72 | 8.91 |
| 31. -⌬-Br | 138-140° | 34.90 | 0.12 | 6.75 | 32.78 | 1.07 | 7.64 |
| 32. -⌬-NO₂ | 161-163° | 37.83 | 1.33 | 11.03 | 33.73 | 1.40 | 12.08 |
| 33. -⌬(NO₂)₂ | 167-169° | 33.90 | 0.94 | 13.21 | 36.10 | 1.37 | 13.06 |

The chloroformic esters employed to prepare the carbazates of Examples 10–14, 26–29 are not conventional acid chlorides, but under the specified reaction conditions (room temperature, tertiary amine type of acid acceptor and inert solvent) they fit within the scope of the QCOA of the generic formula.

INTRODUCTION TO ACID ANHYDRIDE ROUTE

Another preferred synthetic method requires the preparation of tetrachlorocyclopentadienone hydrazone and its reaction with an acid anhydride in an inert solvent taking care to prevent exposure of the reaction mixture to undue heat or alkalinity.

EXAMPLE 34

Anhydrous benzene (250 ml.), tetrachlorocyclopentadienone hydrazone (10.0 grams, 0.043 mole) and dichloroacetic anhydride (10.3 grams, 0.043 mole) were mixed in a 500 ml. round-bottom flask. By reason of the ease of decomposition of the product in its synthesis environment, the synthesis and preliminary isolation of product were conducted without heating. The benzene solvent was removed by controlled vacuum treatment. The residual solid was recrystallized from ethanol giving the product as brown needless (5.1 grams), m.p. 104 –106°C. The alpha dichloroacetyl beta tetrachlorocyclopentadienyl hydrazide had effectiveness as a fungicide, 300 ppm killing 92% of LBT, 67% of LRW, and 52% of BLST (bacterial leaf spot tomato).

EXAMPLE 35

Cyclic anhydrides differ from anhydrides such as $(F_3CCO)_2O$ in that they require the presence of at least some tertiary amine for reaction at room temperature. A 500 ml. round bottom flask contained 250 anhydrous tetrahydrofuran, to which inert solvent was added 6.4g (0.043 mole) phthalic anhydride, 10.0g (0.043 mole) tetrachlorocyclopentadienone hydrozone and 4.4g (0.043 mole) triethylamine. The solution was stirred for 15 minutes. The tetrahydrofuran was removed to provide a brown oil. Extraction of the brown oil with 100 ml of 20% hydrochloric acid removed the triethylamine and provided a brown powder which was recrystallized from ethanol to provide alpha (2-carboxy phenyl)-beta tetrachlorocyclopentadienyl hydrazide having a melting point of 229°–230°C. The compound was effective both as a soil fungicide and as a foliar fungicide.

EXAMPLES 36 – 38

Following the general procedures illustrated by Example 34 or 35, various beta tetrachlorocyclopentadienyl hydrazides were prepared as indicated in Table II.

TABLE II

ELEMENTAL ANALYSIS

| Q | M.P. | CALCULATED | | | FOUND | | |
|---|---|---|---|---|---|---|---|
| | | C | H | N | C | H | N |
| 34. -CHCl₂ | 104-106° | 24.55 | 0.59 | 8.20 | 24.67 | 0.61 | 8.12 |
| 35. -⌬-C(O)-OH | 228-230° | 41.10 | 1.58 | 7.38 | 41.30 | 1.49 | 7.46 |
| 36. -CF₃ | 75-76° | 25.61 | 0.32 | 8.53 | 25.83 | 0.50 | 8.94 |
| 37. -CH=CH-C(O)-OH | 144-145° | 33.2 | 8.5 | 1.2 | 33.63 | 1.24 | 8.52 |
| 38. -C(Cl)=C(Cl)-C(O)-OH | 131-133° | 27.3 | 0.5 | 7.05 | 27.56 | 0.63 | 7.15 |

FUNGICIDAL EFFECTIVENESS

The fungicidal activity of the compounds was established by evaluation of effectiveness in protectant control of the growth of fungus. In the reports relating to such effectiveness, the numbers indicate the fungicidal activity was noted. The numbers indicate the percentage of killing of the fungus. In all tests the damage to the plants was not detectable, and accordingly no tabulation thereof was necessary. The concentrations were in parts per million (ppm). The varieties of fungus were reported as follows:

| Fungus | Code |
| --- | --- |
| late blight tomato | LBT |
| LEAF RUST WHEAT | LRW |
| bacterial leaf spot tomato | BLST |

Data concerning illustrative members of the group are shown in the table entitled Fungicidal Effectiveness.

FUNGICIDAL EFFECTIVENESS

| Example | ppm | LBT | LRW | BLST |
| --- | --- | --- | --- | --- |
| 1 | 75 | 92 | 71 | |
| | 30 | 76 | | |
| 7 | 300 | 94 | 57 | 75 |
| 10 | 33 | 98 | 91 | |
| | 19 | 95 | 69 | |
| 11 | 300 | 91 | 89 | 70 |
| 12 | 75 | 64 | 88 | |
| | 33 | 45 | 87 | |
| 30 | 300 | 68 | 60 | 49 |
| 32 | 300 | | 100 | |
| | 150 | | 54 | |
| 33 | 300 | | | 70 |
| 34 | 300 | 92 | 67 | 52 |

The utility of each of the compounds of Examples 1–38 as a fungicide is established by experts experienced in supervising series of tests on agricultural chemicals.

Compositions suitable for use as an agricultural fungicide may be prepared by using one or more of the designated compounds with an inert carrier, using any of the appropriate liqiud, emulsion, or powdered carriers of previous agricultural control materials.

The invention claimed is:

1. Compound corresponding to a structure

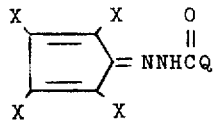

wherein each X is independently selected from F, Cl, Br and I and wherein Q is a $C_1$–$C_6$ alkoxy radical.

2. The compound of claim 1 wherein each X is Cl and Q is methoxy.

* * * * *